United States Patent
Ren et al.

(10) Patent No.: US 9,204,262 B2
(45) Date of Patent: Dec. 1, 2015

(54) FOUNTAIN CODE-BASED COOPERATIVE MULTICAST METHOD

(75) Inventors: Pinyi Ren, Xi'An (CN); Jincheng Lu, Xi'An (CN); Qinghe Du, Xi'An (CN); Zhigang Chen, Xi'An (CN); Yichen Wang, Xi'An (CN); Guangen Wu, Xi'An (CN)

(73) Assignee: XI'AN JIAOTONG UNIVERSITY, Xi'An, Shaanxi (CN)

( * ) Notice: Subject to any disclaimer, the term of this patent is extended or adjusted under 35 U.S.C. 154(b) by 0 days.

(21) Appl. No.: 14/235,446

(22) PCT Filed: Apr. 6, 2012

(86) PCT No.: PCT/CN2012/073603
§ 371 (c)(1),
(2), (4) Date: Jan. 27, 2014

(87) PCT Pub. No.: WO2013/131303
PCT Pub. Date: Dec. 9, 2013

(65) Prior Publication Data
US 2014/0369250 A1  Dec. 18, 2014

(30) Foreign Application Priority Data
Mar. 9, 2012  (CN) .......................... 2012 1 0060329

(51) Int. Cl.
H04W 4/06    (2009.01)
H04L 1/00    (2006.01)
H04L 12/18   (2006.01)

(52) U.S. Cl.
CPC .............. *H04W 4/06* (2013.01); *H04L 1/0077* (2013.01); *H04L 12/189* (2013.01)

(58) Field of Classification Search
None
See application file for complete search history.

(56) References Cited

U.S. PATENT DOCUMENTS

| 2008/0181163 | A1* | 7/2008 | Ye et al. ......................... 370/312 |
| 2009/0175214 | A1* | 7/2009 | Sfar et al. ....................... 370/315 |
| 2011/0170450 | A1* | 7/2011 | Juntti et al. ................... 370/252 |
| 2011/0264977 | A1* | 10/2011 | Chen et al. ..................... 714/749 |

* cited by examiner

*Primary Examiner* — Kodzovi Acolatse

(57) ABSTRACT

A fountain code-based cooperative multicast method comprises: 1) transmitting forwards, by a base station, a code symbol informed by a packet encoded by a fountain code, after receiving a feedback that all users correctly decode, stopping transmitting a data; 2) after completing receiving the data early by a user with good channel conditions, monitoring a "help" signal of other users, when receiving the "help" signal, the user with good channel conditions participates in a cooperation, when receiving the feedback of a cooperative user that has correctly received the data, stopping the cooperation by the user with good channel conditions; and 3) monitoring a feedback signal of remaining users that correctly receive the data by a user that does not complete receiving the data, and deciding whether to transmit a "help" signal, according to a signal intensity of the feedback signal.

3 Claims, 4 Drawing Sheets

FOUNTAIN CODE-BASED COOPERATIVE MULTICAST METHOD

CROSS REFERENCE OF RELATED APPLICATION

This is a U.S. National Stage under 35 U.S.C. 371 of the International Application PCT/CN2012/073603, filed Apr. 6, 2012, which claims priority under 35 U.S.C. 119(a-d) to CN 201210060329.8, filed Mar. 9, 2012.

BACKGROUND OF THE PRESENT INVENTION

1. Field of Invention

The present invention relates to the field of wireless communication technology, and more particularly to a multicast method.

2. Description of Related Arts

In the multicast scenario, multiple users obtain same business data in the same frequency band. Because of different channel conditions of users, the multicast rate is always limited by a user with worst channel condition.

SUMMARY OF THE PRESENT INVENTION

An object of the present invention is to overcome a problem that a conventional multicast system is limited by a user with a worst link, and to provide a fountain code-based cooperative multicast method. On a premise of guaranteeing that all users receive reliably multicast data, the fountain code-based cooperative multicast method further increases a capacity of a multicast system through a coordinated method.

The object of the present invention is realized through a technical scheme as followed.

A fountain code-based cooperative multicast method for a cell of origin (COO) comprising a base station (BS) and several users that demand for a same multicast service, wherein the multicast service is used in a same frequency band, and the BS encodes data of the multicast service with a fountain code, specifically comprising steps of:

1) continuously modulating a packet that is encoded by a fountain code in a carrier and transmitting outwards by a base station (BS), receiving a signal by users with different channel conditions in a same frequency band, after receiving a feedback that all users completes receiving the data, ending transmitting the data by the BS;

2): after decoding correctly and completing receiving the data by the user, transmitting the feedback by the user to the BS that the user has received the data, and then, starting to monitor a "help" signal of other users by the user;

when receiving the "help" signal by the user that has decoded correctly, starting to coordinate through decoding forwarding by the user, and transmitting outwards a fountain code symbol that is same with the fountain code symbol of the BS by the user;

when receiving a feedback that all users coordinated encode correctly and complete receiving the data by the user that is coordinating, ending a cooperation by the user that is coordinating.

Preferably, the fountain code-based cooperative multicast method further comprises steps of:

3): when the user does not complete receiving the data, monitoring a feedback that remaining users complete receiving the data by the user, according to a signal intensity of a feedback signal, deciding whether to transmit the "help" signal by the user.

Preferably, the Step 1) comprises:

1-1): encoding the packet of a multicast service by the BS through a coding method of the fountain code, and then, modulating to the carrier to transmit the packet of the multicast service that is encoded by the BS, until receiving the feedback that all users complete receiving the data, ending a process of encoding and transmitting by the BS;

1-2): in a receiving terminal, accumulating a mutual information by the user from a fountain code symbol received, if defining an instantaneous signal to noise ratio (SNR) between a point i and a point j as $\gamma_{i,j}$, a channel capacity of a link is $$c_{i,j} = B \log_2(1+\gamma_{i,j});$$

and the mutual information that is accumulated by every symbol is represented as $I_s$, and a cycle of every symbol is represented as $T_s$, so $$I_s = T_s B \log_2(1+\gamma_{i,j});$$

after receiving the fountain code symbol, starting to try to decode by the user at periodic intervals;

when the mutual information accumulated is smaller than an entropy of data that is waiting to transmit, decoding by the user fails, thus, the user continues to receive the fountain code symbol to accumulate the mutual information, and the user tries to decode again, wherein a cycle is repeated again and again;

wherein when the mutual information accumulated is larger than the entropy of the data that is waiting to transmit, the user is able to decode correctly;

completing receiving the data and feeding back one ACK signal by the user, for informing the BS of that the user has completed correctly to receive the data.

Preferably, the Step 2) comprises:

2-1): users with better channel conditions accumulate more mutual information at a same time, when ensuring the data that is decoded by the users with the better channel conditions is correct by the users with the better channel conditions through a cyclic redundancy check (CRC), broadcasting one ACK signal by the users with the better channel conditions in a feedback channel, for informing the BS and other users of that the users with the better channel conditions have received correctly the data, and the ACK signal comprises IDs of the users with the better channel conditions.

2-2): after transmitting a feedback signal, starting to monitor the "help" signal of remaining users by the user;

if receiving "help" signal of one or more users by the user that completes receiving the data, recording the ID of the user that is resorting by the user that completes receiving the data, and then, starting to coordinate for other users that do not complete receiving the data by the user that completes receiving the data through decoding forwarding;

receiving symbols that are transmitted by the user that is coordinating and the BS by a user that does not complete receiving the data at the same time, wherein a certain receiving signal to noise ratio (SNR) gain is obtained by the user, for quickening a speed of decoding correctly by the user;

2-3): after receiving ACK signals that are fed back by all users coordinated by the user that is coordinating, ending forwarding the data and exiting the cooperation by the user that is coordinating.

Preferably, the Step 3) comprises:

3-1): waiting for a feedback that a user that is coordinating monitors the remaining users that complete receiving the data by users with worse channel conditions, and measuring a signal to noise ratio (SNR) of the feedback signal that is received by the users with the worse channel conditions;

wherein if the SNR of the feedback signal is smaller than a preset SNR threshold value, which indicates that a link condition between the user that completes receiving the data and the users with the worse channel conditions is not good, so the users with the worse channel conditions are not suitable to receiving the cooperation of the user that completes receiving the data;

wherein if the SNR of the feedback signal is larger than a preset threshold value, which indicates that the link condition between the user that has completed receiving the data and the users with the worse channel conditions is better, so the users with the worse channel conditions are suitable to receiving the cooperation of the user that has completed receiving the data;

starting to transmit the "help" signal outwards by the users with the worse channel conditions, wherein the "help" signal comprises IDs of the users with the worse channel conditions and the ID of the user that is coordinating;

wherein the SNR threshold value that has mentioned above can be ensured by a formula of $SNR_{th}=2^R-1$, and R is a rate requirement of a multicast service;

3-2): after completing receiving the data by the user with the worse channel conditions under the cooperation that the BS and the remaining users, feeding back the ACK signal by the user with the worse channel conditions, for informing the BS and the user that is coordinating of that the user with the worse channel conditions has received the data;

and then, starting to decide whether to coordinate for the remaining users by the user with the worse channel conditions according to the Step 2.

The present invention has advantageous effects as followed. A fountain code is creatively used in a multicast system by the present invention, so a BS does not need to know a channel state information of each user, but still guarantees that all users are able to correctly receive data. Users with good channel conditions complete receiving the data early. And then, according to a channel condition that between the users with the good channel conditions and the other users that do not complete receiving the data, the users with the good channel conditions decide whether to coordinate for the other users that do not complete receiving the data to forward the data. The users whose channel conditions with the BS are poor, under the cooperation of the user that completes receiving the data whose the channel conditions with the users are better, are able to quicken a process of completing receiving the data, and increase the capacity of a system.

These and other objectives, features, and advantages of the present invention will become apparent from the following detailed description, the accompanying drawings, and the appended claims.

DETAILED DESCRIPTION OF THE PREFERRED EMBODIMENT

Figure 1:
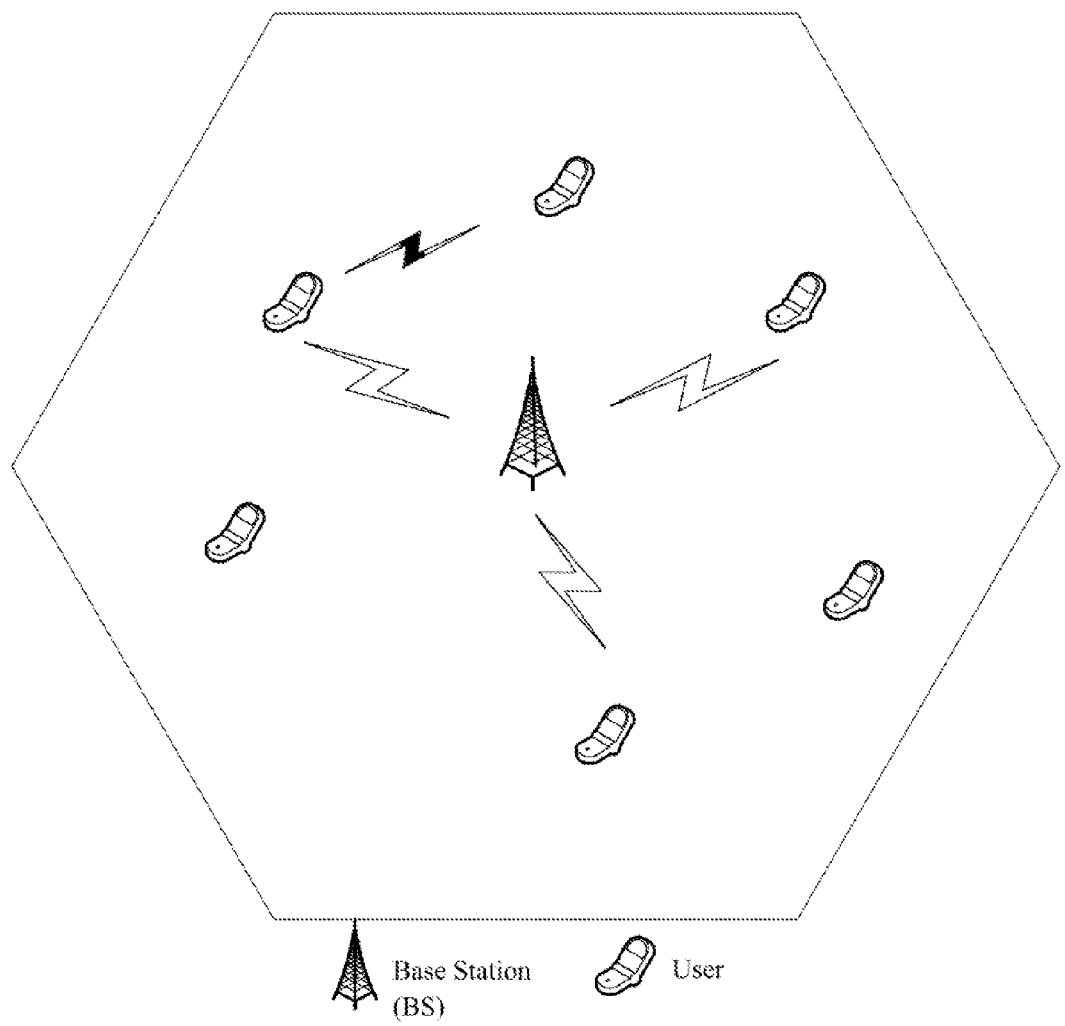
FIG. 1 is a system model diagram of a preferred embodiment according to the present invention.

Referring to the drawings and a specific preferred embodiment, the present invention is further described in detail as followed.

A fountain code uses a linear encoding and decoding method, so an information source continuously produces a code symbol, until receiving a feedback that a user correctly receives the code symbol, the information source stops transmitting the code symbol, so the fountain code is a channel coding that increases a reliability of a transmission. A base station (BS) does not need to know a channel state information of the user, but is still able to guarantee a characteristic that the data can be transmitted reliably, especially suitable for using in a multicast system. After the BS uses the fountain code to encode, different users complete receiving the data in different time, at that time, a user that completes receiving the data early can coordinate for a user that does not complete receiving the data to forward the data, and can further increase a capacity of a system.

A core idea of the present invention is that using a coding method of the fountain code to encode a multicast packet in a sending terminal in the multicast system, in a receiving terminal, users with different channel conditions needs different time to complete receiving the data; wherein the user that completes receiving the data early can be a user that is coordinating to other users that do not complete receiving the data, according to channel conditions of the user that has completed receiving the data, the user that does not complete receiving the data decides whether to transmit a resource signal to the user that has completed receiving the data; if the user that completes receiving the data receives the "help" signal of remaining users, the user that completes receiving the data starts to participate in a cooperation through decoding-and-forwarding, until the user that completes receiving the data receives the feedback of a coordinated user that completes receiving the data.

Figure 2:
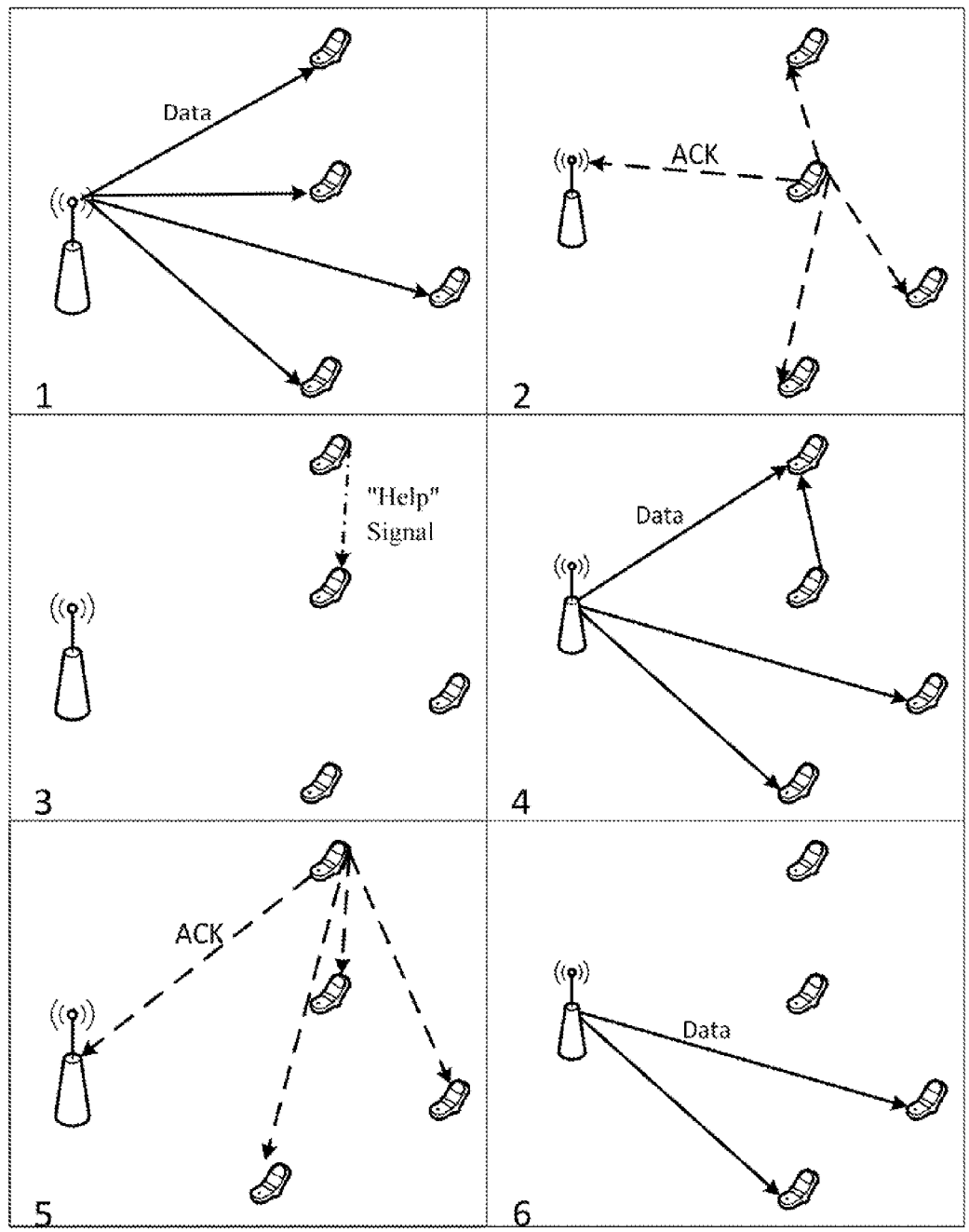
FIG. 2 is a schematic view of steps of the preferred embodiment according to the present invention.
Figure 3:
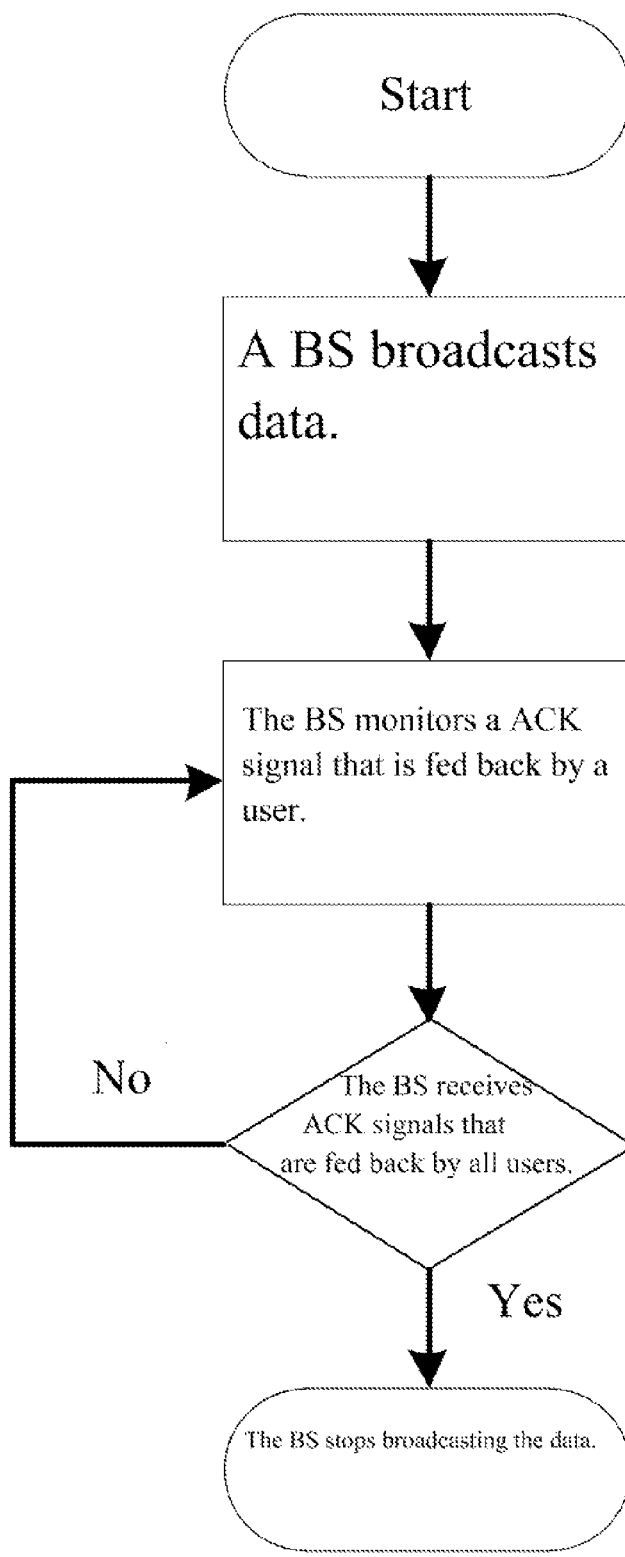
FIG. 3 is a flow chart of a user of the preferred embodiment according to the present invention.
Figure 4:
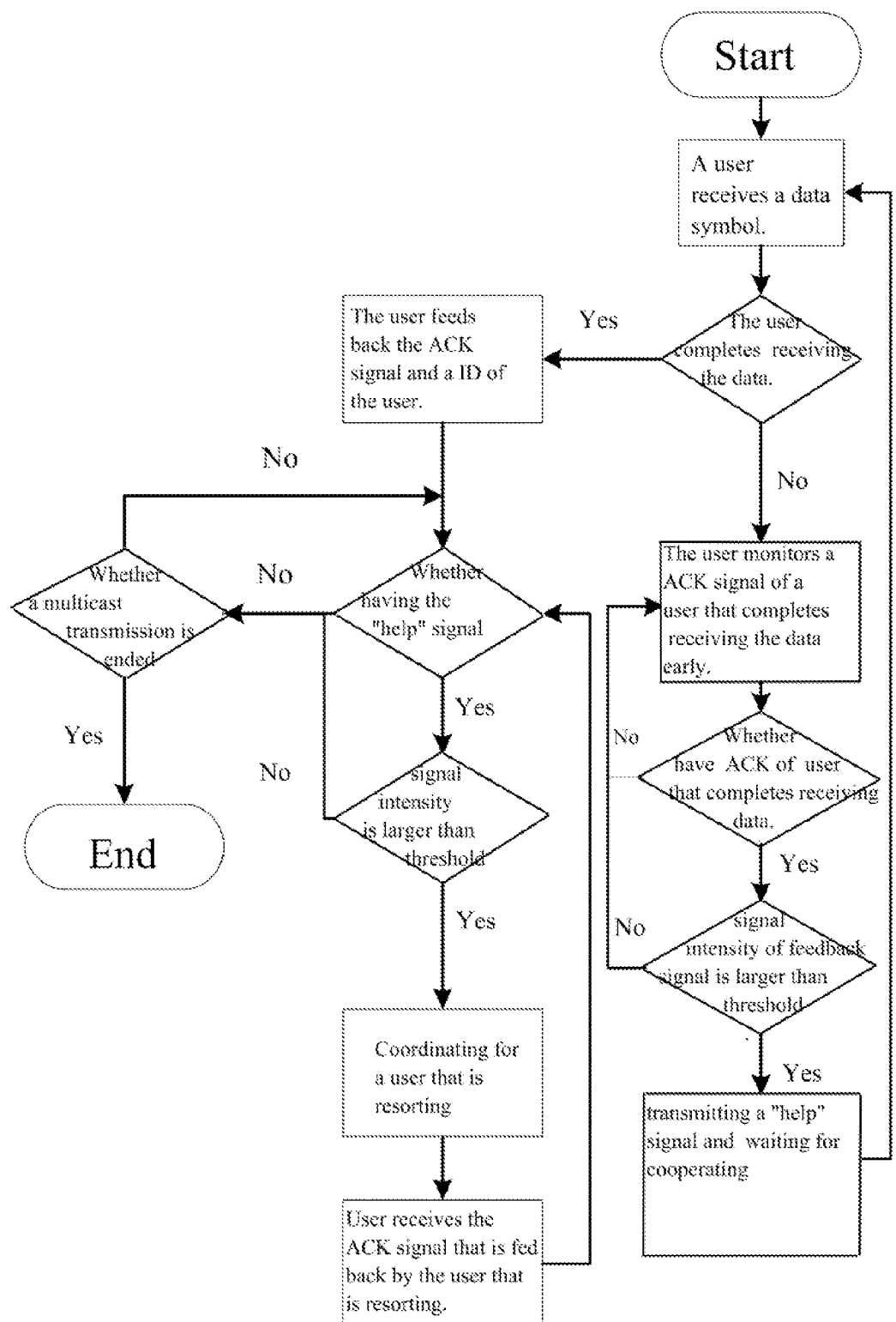
FIG. 4 is a flow chart of a base station (BS) of the preferred embodiment according to the present invention.

Referring to FIG. 1 to FIG. 4 of the drawings, a fountain code based cooperative multicast method of the present invention comprises steps of:

1): encoding a multicast packet by a BS through a coding scheme of a fountain code, comprising steps of:

1-1): in a scenario of a cell of origin (COO) comprising one BS and M users that process with a multicast by the COO;

after starting to process a data with the multicast by the BS data, obtaining the data of the service by the user in a same channel.

Because of an existence of a path loss, an occlusion, a multipath, and other elements, a channel fading among users in different positions and the BS are different. Each user obtains the data of a multicast service in the same channel, but the BS needs to guarantee a fairness, that is to say, all users are able to receive the data. If the BS uses a channel coding scheme with a constant bit rate (CBR) such as a RS code, the BS ensures a code rate based on a user with worst channel conditions, which causes a coding redundancy is too high and a channel resource is wasted. When using the channel coding scheme with the CBR in the multicast, when an interruption of a communication is occurred to a user, i.e., the user receives a wrong packet, the BS needs to retransmit a particular packet to the user, but the wrong packets that are received by different users are usually different, so a very large retransmission burden is brought to the base station. Using the fountain code such as a LT code, a condition of a low spectrum efficiency that mentioned above can be improved. The fountain code can be used in a physical layer and also can be used in a transport layer, and a basic principle of the fountain code is that a sending terminal continuously and randomly selects a number of d symbols from a data symbol that is waiting to transmit to process with an exclusive OR (XOR) to be a coding symbol, and to transmit outwards, until all users receive a packet that is decoded correctly, so a code rate of the fountain code is changed self-adaptively based on channel conditions of users. A parameter d obeys a random distribution, which is called as a degree distribution. After using the coding method of the fountain code, a code symbol is carried with a certain mutual information that is transmitted by the base station, and a receiving terminal accumulates the mutual information through receiving the code symbol, when the mutual information accumulated equals to a bit size of the data, users are able to correctly decode. A speed for users with good channel conditions to accumulate the mutual information is quicker, but the speed for user with poor channel conditions to accumulate the mutual information is slower, so the user with the good channel conditions and the user with the poor channel conditions needs different time to correctly decode the data.

1-2): before transmitting the code symbol by the base station, transmitting one RTS (Ready to Send) signal by the BS to inform the user to prepare for receiving the data, and then, feeding back one CTS (Clear to Send) signal by the user to complete a handshake and to establish a communication.

1-3): after completing receiving the data by the user, transmitting one ACK signal by the user to the base station, for informing the BS of that the user has correctly received the data, when receiving ACK signals of all users by the base station, ending encoding and transmitting the multicast data by the base station.

2): deciding whether to coordinate for remaining users by a user that completes receiving a data early, wherein steps of a cooperation comprise:

wherein because channel conditions of each user are different, after using a coding transmission scheme of a fountain code, each user needs different time to complete decoding a data; the user that completes receiving the data early coordinates for a user that does not complete receiving the data to forward the data, which is able to quicken a speed for the user that does not complete receiving the data to accumulate a mutual information, and to increase an efficiency of a spectrum; a set of users that have correctly received the data is defined as D, a set of users that do not correctly receive the data is defined as U, and a set of users that cooperate for the remaining users is defined as C.

2-1): receiving a code data symbol from a BS by a user, which equals to a process of accumulating a mutual information, when a number of the code data symbol that is received by the user is larger than a threshold value, starting to try to decode by the user.

A decoding method of a LT code comprises a gaussian elimination and a belief propagation method, usually using the belief propagation method with a lower complexity to decode in an actual. In a receiving terminal, the user is able to use a CRC check code to ensure whether the data that is decoded is correct, generally, a cost that is brought by the CRC check code is very small, and an effect of the overhead to a transmission rate is negligible. If decoding the data by the user is unsuccessful, the user continues to receive the code data symbol, until a certain number of symbols are in intervals, decoding the data by the user in a next cycle. If decoding the data by the user is successful, transmitting one ACK packet by the user in a feedback channel in a fixed power, for informing the BS of that the user has correctly received the data, and the packet comprises an ID of the user. Herein, the feedback channel can be monitored by the remaining users.

A threshold value how many the user receives the code data symbols and tries to decode relates to a coding and encoding scheme of the fountain code, for example, a data that is waiting to transmit can be divided into 1000 packets to encode by using the fountain code, so a user with good channel conditions needs to receive 1050 packets to decode correctly, and a user with poor channel conditions may need to receive 1100 packets to decode correctly.

For example, decoding L packets through the fountain code are modulated continuously in a carrier and are transmitted outwards by the base station;

after receiving a number of L(1+ϵ) fountain code symbols by the user, starting to try to decode by the user at periodic intervals;

wherein when the mutual information accumulated is smaller than an entropy of the data that is waiting to transmit, decoding the fountain code symbol by the user is fail, so the user continues to receive a number of K fountain code symbols and to accumulate the mutual information, the user starts to try to decode the fountain code symbol again, wherein a cycle is repeated again and again;

when the mutual information accumulated is larger than the entropy of the data that is waiting to transmit, the fountain code symbol can be decoded correctly by the user;

completing receiving the data and feeding backing one ACK signal by the user, for informing the BS of that the user has correctly completed receiving the data, wherein a selection of a value of L, ϵ, and K relates to the specifical coding scheme of the fountain code that is used.

2-2): after correctly receiving the data by the user and feeding back one ACK signal by the user, starting to monitor whether the remaining users transmit a "help" signal to the user by the user in a dedicated channel, for deciding whether the user participates in the cooperation.

The "help" signal only comprises an ID of the user that is waiting to cooperate and an ID of the user that is resorting, so the dedicated channel only needs to occupy with a relatively little bandwidth. After receiving the "help" signal from the remaining users by the user, starting to cooperate for the remaining users by the user. Because the user has received the correct data, and can be supposed to be able to acquire a coding rule which is used by the base station, so after the user is synchronize with the base station, the user transmits outwards a code symbol that is same with the code symbol of the BS in a same channel in a power P, and a technical principle of a cooperative mode is equivalent to a same data symbol that is transmitted by the BS in the same channel in a plurality of adjacent cells of a signal frequency network (SFN). With the cooperation of the user, it is equivalent to receiving a superposition of two identical signals for the user that is resorting, and the channel conditions between the user that is resorting and a user that is coordinating can be better, in such a manner that the speed of the recourse user to accumulate the mutual information can be increased, and the cooperated user completes correctly receiving the data that can be quicker.

2-3): after receiving the ACK signal that is fed back by the "help" signal that correctly receives the data by the user that is coordinating, stopping coordination of forwarding the data by the cooperative user, wherein exiting the cooperation in time is due to a consideration that an energy efficiency is improved and a network lifetime is prolonged, in such a manner that a condition of the user that has completed correctly receiving the data participates in and exit the cooperation can be ensured.

3): obtaining the cooperation of the remaining users by a user that completes correctly receiving the data slower, comprising steps of:

after monitoring a feedback signal of the remaining users that complete receiving the data by the user that does not complete receiving the data, the user that does not complete receiving the data is able to decide whether to transmit a "help" signal to the remaining users, according to a signal intensity of the feedback signal.

3-1): The user that does not complete receiving the data not only receives a data symbol in a multicast channel, but also monitors whether an ACK signal that is transmitted by the remaining users that complete receiving the data are in a feedback channel. After monitoring the ACK signal of the remaining users that complete receiving the data by the user that does not complete receiving the data, the user that does not complete receiving the data is able to measure a signal to noise ratio (SNR) of the ACK signal, in such a manner that a condition of a channel fading between the user that does not complete receiving the data and the user has completed receiving the data can be estimated. If the SNR of the feedback signal received is larger than a preset threshold value of the SNR ($SNR_{th}$), which indicates that channel conditions between the user that does not complete receiving the data and the user has complete receiving the data is better, and the user that does not complete receiving the data is able to transmit the "help" signal to the user that has complete receiving the data in a dedicated channel.

A selection of a value of the $SNR_{th}$ determines a threshold for the user to participate in the cooperation, i.e., every time a number of users that participate in the cooperation of transmitting is more or less. A determination of the $SNR_{th}$ relates to a rate requirement of a multicast service. The multicast service possesses a higher transmission rate requirement, which is able to reduce a value of the $SNR_{th}$, so more users will participate in the cooperation, but more energies will be consumed. If a transmission rate that is required by the multicast service is lower, the value of the $SNR_{th}$ can be increased, for making a part of users with best channel conditions participate in the cooperation, so the rate requirement can be guaranteed and an energy consumption can be reduced. The value of the $SNR_{th}$ that mentioned above can be ensured by a formula of $SNR_{th}=2^R-1$, and R is the rate requirement of the multicast service, when users are more intensive, the selection of a value of the $SNR_{th}$ can even select a larger $SNR_{th}$ to filter a cooperative user with a high efficiency.

3-2): After transmitting the "help" signal by the user that does not complete receiving the data, the user that does not complete receiving the data is able to obtain the cooperation of the remaining users. After completing correctly receiving the data by the user that does not complete receiving the data, the user that does not complete receiving the data needs to feed back one ACK signal, for informing the BS and the coordinating user that the user that does not complete receiving the data has correctly received the data. And then, the user that does not complete receiving the data decides whether to cooperate for other users that do not complete receiving the correct data, according to the Step 2).

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fountain code-based cooperative multicast method for a cell of origin (COO) comprising a base station (BS) and some users that demand for a same multicast service, wherein said multicast service is used in a same frequency band and said BS encodes data of said multicast service with a fountain code, the method comprising steps of:

1) continuously modulating a carrier with said data that is encoded by a fountain code and transmitting said data outwards by said BS; receiving said data by users with different channel conditions in a same frequency band; after receiving a feedback that all users complete receiving said data, ending the transmitting said data by said BS;

accumulating, by a user, a mutual information from a received fountain code symbol, said mutual information represented as $I_s=T_s Bc_{i,j}$ wherein $T_s$ represents a cycle of every symbol and $c_{i,j}=\log_2(1+\gamma_{i,j})$ represents a channel capacity of a link and $\gamma_{i,j}$ is an instantaneous signal to noise ratio (SNR) between a point i and a point j of said link;

after receiving said fountain code symbol, trying to decode said fountain code symbol by said user at periodic intervals;

wherein when said mutual information accumulated is smaller than an entropy of data that is waiting to be transmitted, the decoding by said user fails, continuing receiving said fountain code symbol to accumulate said mutual information and trying to decode again said fountain code symbol by said user;

wherein when said mutual information accumulated is larger than said entropy of said data that is waiting to be transmitted, said user is able to decode said fountain code symbol correctly; and completing receiving said data and feeding back an ACK signal by said user for informing said BS that said user has completed receiving correctly said data;

2) after decoding correctly and completing receiving said data by said user, transmitting said feedback by said user to said BS for informing said BS that said user has received said data and then starting to monitor a "help" signal of other users by said user in a dedicated channel; wherein when receiving said "help" signal by said user that has decode correctly, starting to coordinate through decoding forwarding by said user and transmitting outwards by said user a fountain code encoded symbol that is same as said fountain code encoded symbol of said BS; and when receiving a feedback that all coordinated users complete receiving said data by said user that is coordinating, ending a cooperation by said user that is coordinating.

2. A fountain code-based cooperative multicast method for a cell of origin (COO) comprising a base station (BS) and some users that demand for a same multicast service, wherein said multicast service is used in a same frequency band and said BS encodes data of said multicast service with a fountain code, the method comprising steps of:

1) continuously modulating a carrier with said data that is encoded by a fountain code and transmitting said data outwards by said BS; receiving said data by users with different channel conditions in a same frequency band; after receiving a feedback that all users compete receiving said data, ending the transmitting said data by said BS;

2) after decoding correctly and completing receiving said data by a user, transmitting said feedback by said user to said BS for informing said BS that said user has received correctly said data; and after transmitting said feedback, starting to monitor a "help" signal of remaining users by said user; wherein if receiving said "help" signal of one or more remaining users by said user that completes receiving said data, recording an identifier (ID) of one or more remaining users and starting to coordinate for other users that do not complete receiving correctly said data by said user that completes receiving said data through decoding and forwarding;

receiving symbols that are transmitted by said user that is coordinating and said BS by a user that does not complete receiving said data, after receiving ACK signals that are fed back by all users coordinated by said user that is coordinating, ending forwarding said data and exiting said cooperation by said user that is coordinating; wherein step 2) further comprises:

ensuring said encoded data is correctly decoded by users with better channel conditions through cyclic redundancy check (CRC), broadcasting an ACK signal by said users with said better channel conditions in a feedback channel for informing said BS and other users that said users with said better channel conditions have received correctly said encoded data and said ACK signal comprises identifiers (IDs) of said users with better channel condition.

3. A fountain code-based cooperative multicast method for a cell of origin (COO) comprising a base station (BS) and some users that demand for a same multicast service, wherein said multicast service is used in a same frequency band and said BS encodes data of said multicast service with a fountain code, the method comprising steps of:

1) continuously modulating a carrier with said data that is encoded by a fountain code and transmitting said data outwards by said BS; receiving said data by users with different channel conditions in a same frequency band; after receiving a feedback that all users compete receiving said data, ending the transmitting said data by said BS;

2) after decoding correctly and completing receiving said data by said user, transmitting said feedback by said user to said BS for informing said BS that said user has received said data and then starting to monitor a "help" signal of other users by said user in a dedicated channel; wherein when receiving said "help" signal by said user that has decode correctly, starting to coordinate through decoding forwarding by said user and transmitting outwards by said user a fountain code symbol that is same as said fountain code symbol of said BS; and when receiving a feedback that all coordinated users complete receiving said data by said user that is coordinating, ending a cooperation by said user that is coordinating and when a user does not complete receiving said data, monitoring a feedback signal from remaining users that complete receiving said data according to a signal intensity of the feedback signal, deciding whether to transmit said "help" signal by said user;

waiting for a feedback from said user that is coordinating by users with worse channel conditions, and measuring a signal to noise ratio (SNR) of said feedback signal that is received by said users with said worse channel conditions;

wherein if said SNR of said feedback signal is smaller than a preset SNR threshold value, which indicates that a link condition between said user that completes receiving said data and said users with said worse channel conditions is not good, said users with said worse channel conditions are not suitable to receiving a cooperation of said user that completes receiving said data;

wherein if said SNR of said feedback signal is larger than a preset threshold value, which indicates that said link condition between said user that has completed receiving said data and said users with said worse channel conditions is better, said users with said worse channel conditions are suitable to receiving said cooperation of said user that has completed receiving said data;

starting to transmit said "help" signal outwards by said users with said worse channel conditions, wherein said "help" signal comprises IDs of said users with said worse channel conditions and said ID of said user that is coordinating;

wherein said SNR threshold value that has mentioned above can be ensured by a formula of $SNR_{th}=2^R-1$, and R is a rate requirement of a multicast service; and after completing receiving said data by said user with said worse channel conditions under said cooperation that said BS and said remaining users, feeding back an ACK signal by said user with said worse channel conditions, for informing said BS and said user that is coordinating of that said user with said worse channel conditions has received said data; and starting to decide whether to coordinate for said remaining users by said user with said worse channel conditions according to said Step 2).

* * * * *